(12) United States Patent
Hsu et al.

(10) Patent No.: US 11,117,212 B2
(45) Date of Patent: Sep. 14, 2021

(54) SYSTEMS AND METHODS FOR ADDITIVE MANUFACTURING UTILIZING LOCALIZED ULTRASOUND-ENHANCED MATERIAL FLOW AND FUSIONING

(71) Applicant: Arizona Board of Regents on behalf of Arizona State University, Scottsdale, AZ (US)

(72) Inventors: Keng Hsu, Tempe, AZ (US); Anagh Deshpande, Tempe, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 221 days.

(21) Appl. No.: 15/901,643

(22) Filed: Feb. 21, 2018

(65) Prior Publication Data

US 2018/0185955 A1 Jul. 5, 2018

Related U.S. Application Data

(63) Continuation of application No. PCT/US2016/048899, filed on Aug. 26, 2016.

(60) Provisional application No. 62/210,041, filed on Aug. 26, 2015.

(51) Int. Cl.
*B23K 20/10* (2006.01)
*B33Y 10/00* (2015.01)
*B33Y 30/00* (2015.01)
*B33Y 70/00* (2020.01)

(52) U.S. Cl.
CPC .............. *B23K 20/10* (2013.01); *B33Y 10/00* (2014.12); *B33Y 30/00* (2014.12); *B33Y 70/00* (2014.12)

(58) Field of Classification Search
CPC ........ B23K 20/10; B22F 3/1055; C21D 10/00
See application file for complete search history.

(56) References Cited

U.S. PATENT DOCUMENTS 5,884,835 A * 3/1999 Kajiwara ............. B23K 20/007
228/110.1
6,457,629 B1 10/2002 White
6,463,349 B2 10/2002 White et al.
(Continued)

FOREIGN PATENT DOCUMENTS

WO 01/20534 3/2001
WO 01-20534 A1 3/2001
(Continued)

OTHER PUBLICATIONS

"Ultrasonic Welding Wire Termination", Saeed Mogadam, Stapla Ultrasonics Corp., MA. (Year: 1997).*
(Continued)

*Primary Examiner* — Anthony J Zimmer
*Assistant Examiner* — Sean P. O'Keefe
(74) *Attorney, Agent, or Firm* — Snell & Wilmer L.L.P.

(57) ABSTRACT

Ultrasonic filament modeling systems and methods may be utilized to achieve room-temperature 3-D printing of solid (>95%) metal materials. A vibrating tool is applied to a metal filament to form a voxel, inducing mechanical deformation as well as inter-and intra-layer mass transport. Desired structures may be built on a voxel-by-voxel basis. Additionally, by varying the applied ultrasonic energy, the microstructure of the resulting structure may be controlled.

19 Claims, 15 Drawing Sheets

(56) References Cited

U.S. PATENT DOCUMENTS

| | | | |
|---|---|---|---|
| 6,519,500 | B1 | 2/2003 | White |
| 2006/0137775 | A1 | 6/2006 | White |
| 2007/0295440 | A1 | 12/2007 | Stucker |
| 2012/0061027 | A1 | 3/2012 | Short |
| 2012/0125520 | A1 | 5/2012 | Akio |
| 2013/0213552 | A1* | 8/2013 | Kelch ............... B29C 66/1122 156/73.1 |
| 2014/0268604 | A1 | 9/2014 | Wicker et al. |
| 2015/0041025 | A1 | 2/2015 | Wescott et al. |
| 2015/0064047 | A1* | 3/2015 | Hyde ................. B22F 3/1055 419/26 |
| 2017/0072633 | A1 | 3/2017 | Hsu |
| 2019/0039137 | A1 | 2/2019 | Hildreth et al. |
| 2019/0384167 | A1 | 12/2019 | Hsu et al. |

FOREIGN PATENT DOCUMENTS

| | | | | |
|---|---|---|---|---|
| WO | WO-0120534 | A1 * | 3/2001 | ............ B33Y 10/00 |
| WO | WO2015031453 | A1 | 3/2015 | |
| WO | WO2017143013 | A1 | 8/2017 | |
| WO | WO2018140811 | A1 | 8/2018 | |

OTHER PUBLICATIONS

Gibert, James, "Dynamics of Ultrasonic Consolidation" (2009). All Dissertations. 496. https://tigerprints.clemson.edu/all_dissertations/496 (Year: 2009).*

Kong, C.Y. and R.C. Soar, Fabrication of metal-matrix composites and adaptive composites using ultrasonic consolidation process. Materials Science and Engineering: A, 2005. 412(1-2): p. 12-18.

Johnson, Ken. Ultrasonic Consolidation of Titanium Alloys for High Performance Military Aircraft Damage Repair. 2005 Dec. 16, 2005.

George, J and B Stucker, Fabrication of lightweight structural panels through ultrasonic consolidation. Virtual and Physical Prototyping, 2006. 1(4): p. 227-241.

Kong, C.Y., R.C. Soar, and P.M. Dickens, Ultrasonic consolidation for embedding SMA fibres within aluminum matrices. Composite Structures, 2004. 66(1-4):p. 421-427.

Wittke, K., "The system of processes to produce unbreakable joints", Schweisstechnik, Berlin 22, 1972, n. 3, pp. 97-100.

Joshi, K. "The Formation of Ultrasonic Bonds between Metals", Welding Journal, Dec. 1971, No. 12, pp. 840-848.

Siddig, T.E. Sayed, "Acoustic softening in metals during ultrasonic assisted deformation via CP-FEM", Materials LEtters, 65, 2011, 356-359.

Siddig, T.E. Sayed, "Ultrasonic-assisted manufacturing processes: Variational model and numerical simulations", Ultrasonics, 52, 2012, 521-529.

J. Tsujino, K Hasegawa, "Ultrasonic bonding using high frequency 330, 600k Hz and complex vibration 190k Hz wedling systems", Ultrasonics, 1996, 223-228.

J. Tsujino, H. Yoshihara, T. Sano, S. Ihara, "High-frequency ultrasonic wire bonding systems", Ultrasonics, 2000, 7-80.

M. Monzonm, C. Collar E, "Aplicacion C.A.E. para diseno de cabezales", de extrusion de termoplasticos yelastomeros. Revista de Plasticos Modernos, 1998, 505:79-87.

M. Monzon, I. Gibson, A. Benitez, M. Marrero et al., "Process and Material behavior modeling for a new design of micro-additive fused deposition," Int. J. Adv. Manuf. Technol., 2013,677:2717-2726.

H. Hsu, P. Schultz, P. Ferreria, N. Fang, "Expliting transport of guest metal ions in a host ionic crystal lattic for nanofabrication: Cu nanopattering with Ag2s," Applied Physics A, 2009, 97, 863-868.

European Search Report in the European Application No. EP16840188 dated Mar. 29, 2019.

M.R. Sriraman et al. "Thermal transients during processing of materials by very high power ultrasonic additive manufacturing", Journal of Materials Processing Technolgy, vol. 211, No. 10, Oct. 31, 2010 (Oct. 31, 2010), pp. 1650-1657, XP055571679, NL ISSN:0934-0136, DOI: 10.1016/j.jmatprotec.2011.05.003 * paragraph [03.3]; figure 7*.

CNIPA; Office Action dated Jul. 29, 2019 in Application No. 201680062520.2.

IPOS; Written Opinion dated Feb. 11, 2019 in Application No. 11201801460X.

International Preliminary Report on Patentability dated Mar. 8, 2018 in the International Application PCT/US2016/048899.

IPOS; Written Opinion dated Dec. 16, 2019 in SG Application No. 11201801460X.

CN; Chinese Notice of Allowance in the Chinese Patent Application No. 201680062520.2 dated Jun. 1, 2021.

CN; Chinese 2nd Office Action in the Chinese Patent Application No. 201680062520.2 dated Jun. 15, 2020.

JP; Japanese Office Action in the Japanese Patent Application No. 2018-510868 dated Apr. 12, 2021.

SG; Singapore Notice of Allowance in the Singapore Patent Application No. 11201801460X dated Dec. 14, 2020.

SG; Singapore Examination Report in the Singapore Patent Application No. 11201801460X dated Nov. 9, 2020.

* cited by examiner

SYSTEMS AND METHODS FOR ADDITIVE MANUFACTURING UTILIZING LOCALIZED ULTRASOUND-ENHANCED MATERIAL FLOW AND FUSIONING

CROSS-REFERENCE TO RELATED APPLICATIONS

This application is a continuation of PCT/US2016/048899 entitled "SYSTEMS AND METHODS FOR ADDITIVE MANUFACTURING UTILIZING LOCALIZED ULTRASOUND-ENHANCED MATERIAL FLOW AND FUSIONING" filed on Aug. 26, 2016. PCT/US2016/048899 claims priority to, and the benefit of, U.S. Provisional Application No. 62/210,041 entitled "SYSTEMS AND METHODS FOR ADDITIVE MANUFACTURING UTILIZING LOCALIZED ULTRASOUND-ENHANCED MATERIAL FLOW AND FUSIONING" filed on Aug. 26, 2015. Each of the aforementioned applications is incorporated herein by reference in their entirety for all purposes.

TECHNICAL FIELD

The present disclosure relates to additive manufacturing, and particularly to additive manufacturing approaches utilizing localized ultrasound-enhanced material flow and fusioning.

BACKGROUND

Currently, additive manufacturing approaches suffer from various drawbacks. Accordingly, improved additive manufacturing systems and methods remain desirable.

BRIEF DESCRIPTION OF THE DRAWINGS

With reference to the following description and accompanying drawings.

DETAILED DESCRIPTION

Figure 1:
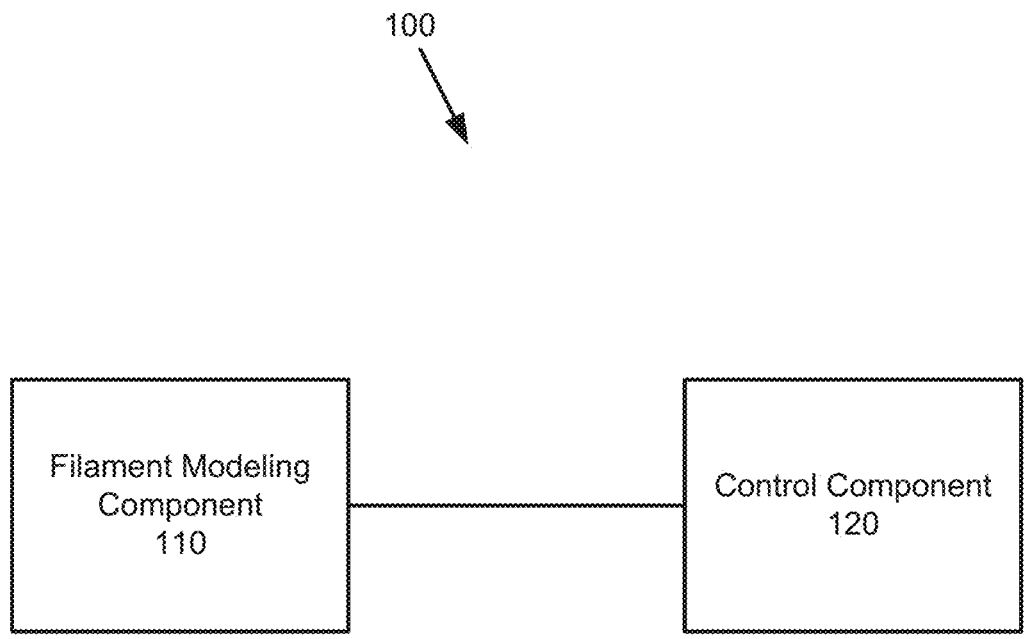
FIG. 1 illustrates an exemplary additive manufacturing system in accordance with an exemplary embodiment.

The following description is of various exemplary embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments without departing from the scope of the present disclosure.

For the sake of brevity, conventional techniques for additive manufacturing, wire bonding, 3-D printing, and/or the like may not be described in detail herein. Furthermore, the connecting lines shown in various figures contained herein are intended to represent exemplary functional relationships and/or physical or communicative couplings between various elements. It should be noted that many alternative or additional functional relationships may be present in a practical additive manufacturing system and related methods of use.

Over the last several decades, the idea of constructing a 3-dimensional object "additively" layer by layer has gone from a rapid prototyping tool for concept visualization, to a current production tool capable of producing end-user engineering parts, and is headed in a direction to not only revolutionize the manufacturing industry, but to redefine fundamentally how things are made. The implication of this transition is immense: permeating conceivably every layer of the human experience: aerospace, automobiles, bio-medical, military, electronics, consumer goods, foods, and personal products. At present, additive manufacturing of polymers with production quality is affordable and accessible. However, prior approaches for additive manufacturing of fully-dense metals are far from being affordable and accessible.

Prior metal additive manufacturing processes include indirect methods such as the Binder Jet processes, Ultrasonic Consolidation (UC), and Laminate Object Manufacturing (LOM), and direct methods like Selective Laser Melting (SLM), Electron Beam Melting (EBM), and Laser Engineered Net Shaping (LENS). Indirect methods require post-processing to produce fully dense parts. In certain processing approaches, metal particles are either partially melted or a low-melting point binder is used to bind metal particles together. Therefore, when high-bulk density parts are desired, post-processing operations are required such as binder removal, sintering or liquid metal infiltration. Ultrasonic Consolidation is a hybrid additive-subtractive process where sheets (or strips) of metal foils are first ultrasonically welded into a stack. A cutting operation (often end-milling) is then used to shape the metal stack into the desired layer shape. By alternating between these welding and cutting processes, 3-dimensional objects are constructed. LOM follows the same alternating adding and cutting process as UC, but the welding steps are replaced by adhesives applied between sheets, and a post-fabrication sintering process may be required.

Moreover, prior direct metal processes involved use of thermal energy to melt and bond the material through the manipulation of a meltpool created by heat coupled into metal powder through either a laser or an electron beam. The resulting structures, morphology, and microstructures of printed materials depend highly on the thermal-physical and heat-transfer processes during the micro-welding event. Another distinct characteristic of these direct metal additive manufacturing processes is the use of fine powder as the starting material, typically 20 microns or so in mean diameter, and the process takes place under a controlled environment of inert gases or vacuum to prevent oxidation, beam scattering in the case of electron beam melting, and process hazards. Though high-quality metal parts can be produced, these characteristics present a major barrier to technology cost-reduction and accessibility.

In contrast to the shortcomings of prior approaches, exemplary embodiments disclosed herein allow additively fabricating virtually fully-dense (e.g. 95% of the density of solid metal or more) metal articles in ambient conditions at room temperature. Various exemplary embodiments utilize an Ultrasonic Filament Modeling (UFM) process. A working principle of the UFM process can be analogized as a marriage of Wire Bonding and Fused Deposition Modeling: a solid metal filament is used as the starting material to form a 3-dimensional object via metallurgical bonding between the roads and layer.

With reference now to FIG. 1, in an exemplary embodiment an additive manufacturing system 100 comprises a filament modeling component 110 and a control component 120. Filament modeling component 110 is configured to provide and additively deposit a filament (for example, a filament comprising one or more of aluminum, titanium, silver, gold, copper, steel alloy, metal-polymer hybrids and/or the like) onto a substrate. Control component 120 governs the operation of filament modeling component 110, allowing formation of complex 3-D structures.

Figure 2A:
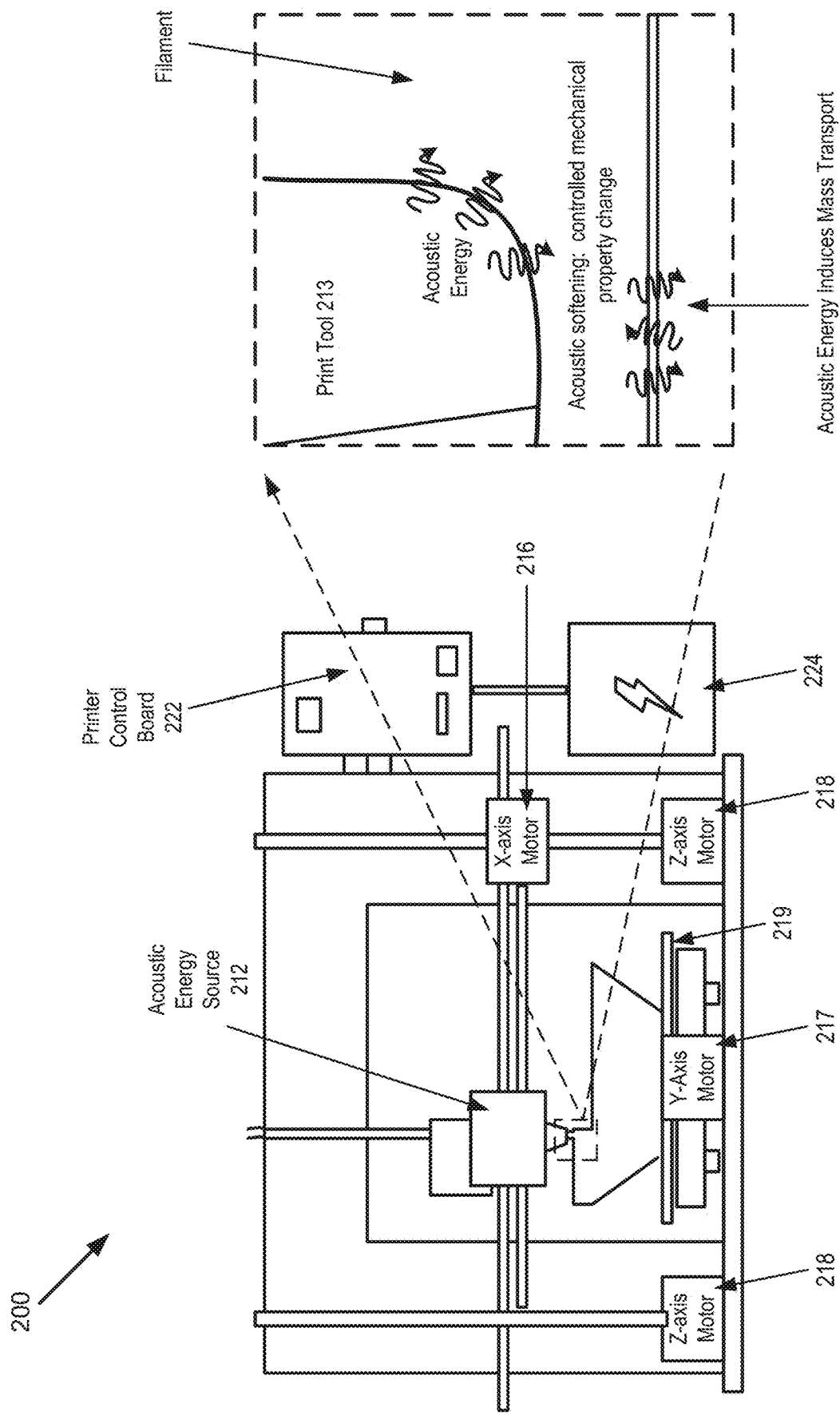
FIG. 2A illustrates operation of an exemplary additive manufacturing system in accordance with an exemplary embodiment.
Figure 2B:
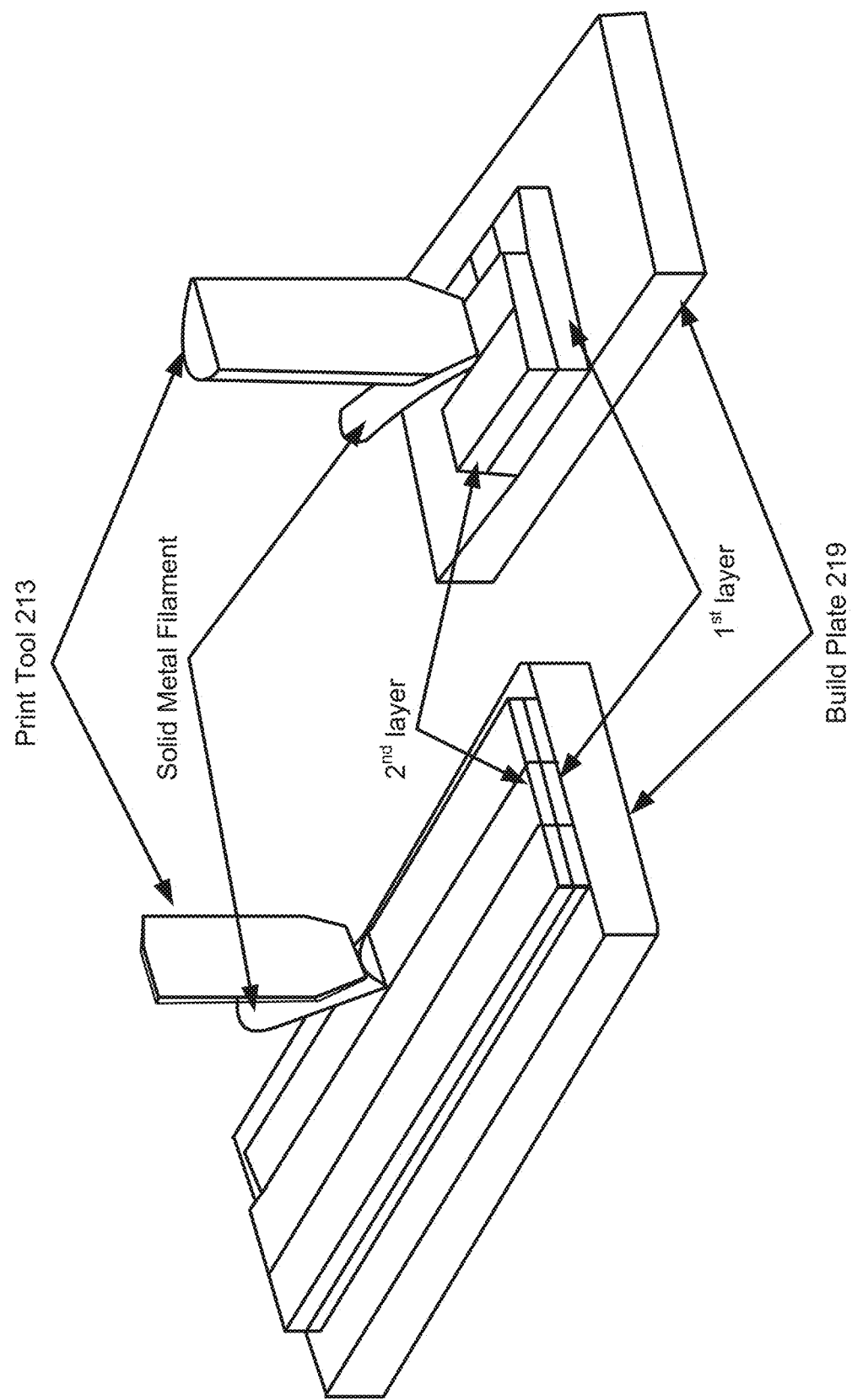
FIG. 2B illustrates operation of an exemplary additive manufacturing system in parallel and orthogonal layer approaches in accordance with an exemplary embodiment.

As shown in FIGS. 2A and 2B, in some embodiments, exemplary mechanics and tooling configurations of UFM are analogous to the FDM process where a heated thermoplastic extruder directly "writes" the roads and layers that make up the 3-D component. However, in contrast, in UFM a solid metal filament is guided, shaped, and metallurgically bonded to the substrate (or the previous layer) as well as the adjacent filaments voxel by voxel using a guide tool on a positioning system.

Those skilled in the art will appreciate that important aspects or characteristics of the UFM process are: (1) the mechanical stress and therefore mechanical energy input) required to "shape" the filament into the desired road geometry is drastically reduced (<50%) in the presence of applied ultrasonic vibrations as compared to the yield strength of the material; (2) the amount of mass transport across the inter-filament and inter-layer interfaces to form the metallurgical bonds observed is more than 10,000 times higher than what Fick's diffusion predicts under the observed conditions; and (3) the temperature rise of the UFM process is nearly negligible, a reflection of the high coupling efficiency from acoustic energy input into the required plasticity and mass transport. These unique characteristics enable the Ultrasonic Filament Model process disclosed herein to be implemented within a desktop 3-D printing environment, as well as within a high-precision, high-fidelity industrial additive manufacturing setting. Additionally, UFM's unique nature of fully-dense metal 3-D printing at room temperature enables simultaneous printing of polymers and metals, a materials combination not feasible in melt-fuse based metal additive manufacturing processes.

With reference now to FIGS. 2A and 2B, in an exemplary embodiment an additive manufacturing system 100, for example additive manufacturing system 200, comprises an acoustic energy source 212, an X-axis motor 216, a y-axis motor 217, at least one z-axis motor 218, a printer control board 222, and a power source 224. Additive manufacturing system 200 may also comprise a build plate 219 for use in depositing 3-D printed objects thereon; build plate 219 may be fixed in place or may be translatable and/or rotatable in the x, y, and z dimensions.

In an exemplary embodiment, additive manufacturing system 200 utilizes an ultrasonic vibration source in acoustic energy source 212. Moreover, acoustic energy source 212 may further comprise a print tool 213 for use in guiding a filament and transferring acoustic energy thereto. Acoustic energy source 212 may further comprise a stainless steel from connected to a piezoelectric crystal oscillating at a frequency of 60 kHz. Acoustic energy source 212 may provide a desired amount of ultrasonic energy, for example 5 watts, 10 watts, 15 watts, and/or the like. The ultrasonic energy supplied to the aluminum voxel is modulated, for example through vibrational amplitude and time. At the end of the stainless steel horn is a print tool 213 (for example, formed of tungsten carbide or other suitable durable material) which guides and forms voxels from a filament (for example, 300 μm-diameter 99.99% Al). In addition to ultrasound energy input modulation; the force with which the metal filament is pressed onto the substrate/existing layer can also be controlled.

Print tool 213 may comprise a blade, needle, cylinder, rectangle, slab, or other suitable shape. Print tool 213 may be configured with any suitable dimensions and/or materials, for example an aspect ratio configured to achieve an amplitude of vibration at the free end of print tool 213 of about 1 micron responsive to an applied ultrasonic vibration of about 60 kHz applied to print tool 213. In one exemplary embodiment, print tool 213 is configured with a width of about 3 mm and a length of between about 12 mm and 25 mm. In another exemplary embodiment, print tool 213 is configured with a width of about 2 mm and a length of about 12 mm. Moreover, it will be appreciated that the dimensions of print tool 213 may be selected and/or adjusted as desired, for example based on the dimensions of the metal filament utilized in additive manufacturing system 200, the particular metal or alloy comprising the metal filament, and/or the like. A particular print tool 213 may be removed from additive manufacturing system 213 and replaced with a different print tool 213 in order to accommodate different materials and/or achieve different properties for deposited materials.

In an exemplary embodiment, operation of additive manufacturing system 200 begins by bringing print tool 213 guiding the filament to the desired voxel location and holding the filament in place with nominal pressure (for example, via operation of one or more of motors, 216, 217, or 218). Once positioned, the filament is supplied with ultrasonic energy through print tool 213. The combination of force applied by print tool 213 and the irradiation of ultrasound energy allows the section of the filament defined by the print tool/filament contact to form and to fuse onto the substrate/existing layer, forming the voxel. This process repeats as print tool 213 moves down the axis of the metal filament until the desired "road" is completed. Each voxel may overlap with the previous and the following voxel and with those in the adjacent roads. This process then repeats for each road and for each layer, until the desired structure is formed. In various exemplary embodiments, additive manufacturing system 200 may achieve a target speed of build, for example, 0.2 mm3/second, 0.3 mm3/second, and/or the like, depending on input power, filament material, etc.

Figure 2C:
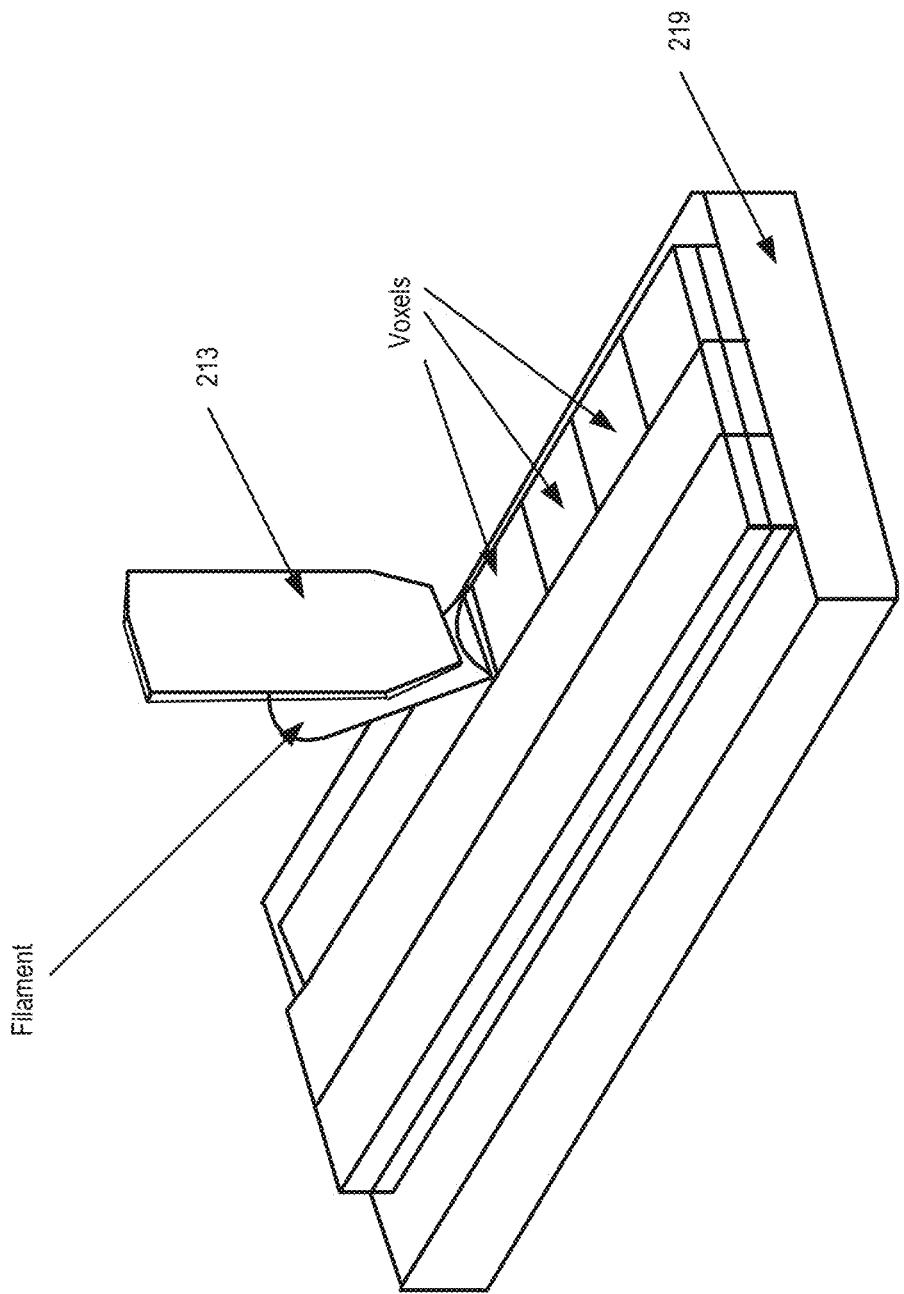
FIG. 2C illustrates operation of an exemplary additive manufacturing system in a continuous stitch approach in accordance with an exemplary embodiment.
Figure 4:
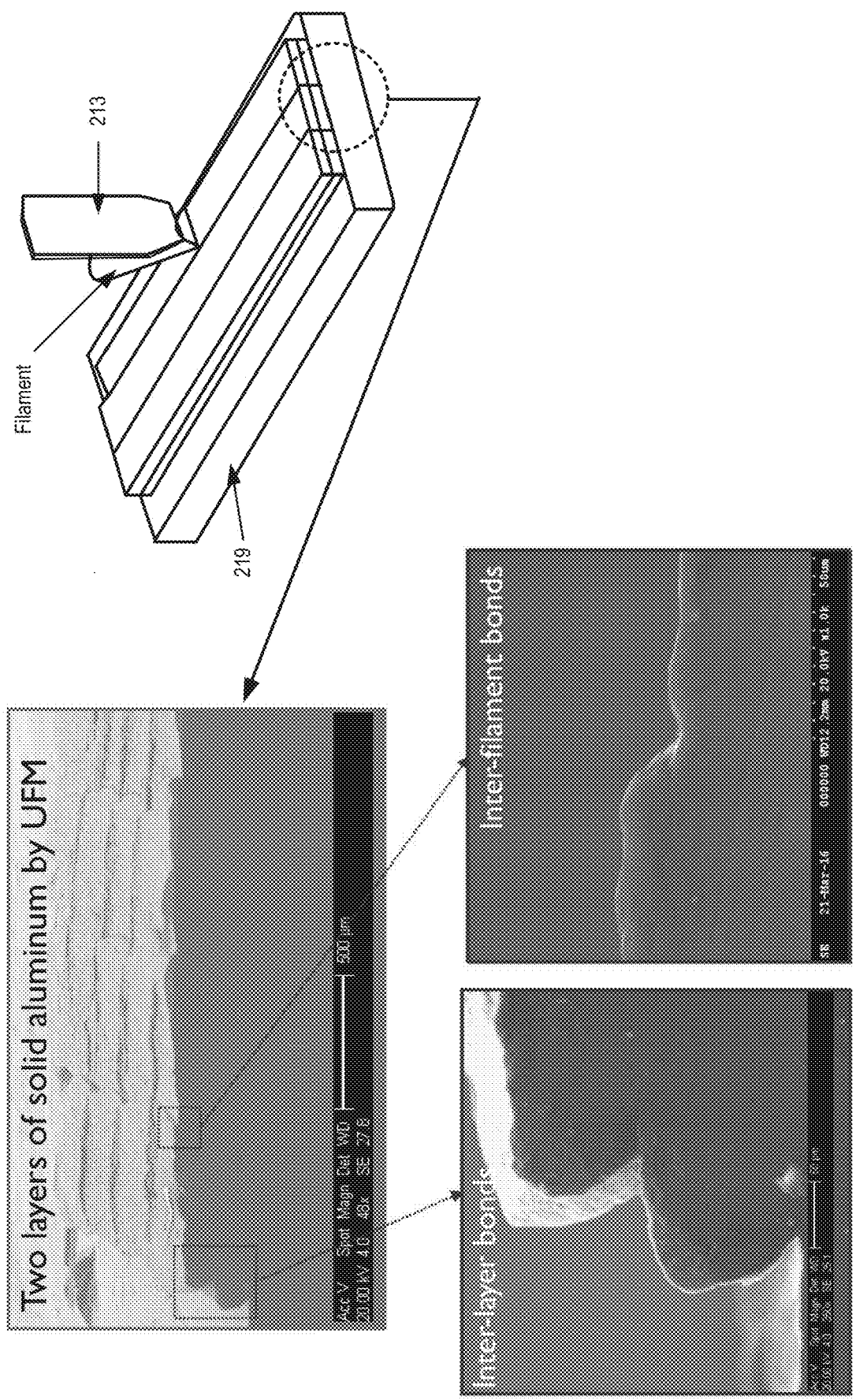
FIG. 4 illustrates results of operation of an exemplary additive manufacturing system in a continuous stitch mode in accordance with an exemplary embodiment.

In an exemplary embodiment, additive manufacturing system 200 is operative to couple acoustic energy into a fully-dense metal filament, to guide the filament, and to induce the voxel shaping and material fusion desirable for 3-D printing. The acoustic energy source 212 utilizes a piezoelectric crystal-based transducer oscillating at a frequency of about 60 kHz (more broadly, between about 40 kHz and about 200 kHz). During the UFM process, the print tool 213 delivers the ultrasonic energy to the interfaces between a solid filament (for example, solid aluminum, 300 microns dia., 99.99% pure) and an existing surface as depicted in FIGS. 2A through 2C. As ultrasonic energy is used to shape the filament and allow the metallurgical bond on the metal-metal interface to form, the print tool 213 steps down the length of the filament to form a "road" of solid metal, for example of dimensions ~600 microns in width and ~125 microns in height. These steps are then repeated to form adjacent roads that make up one layer, followed by repeating road-wise and layer-wise steps to form a 3-dimensional object. Shown in FIG. 4 are scanning electron microscopy images of a two-layer structure built following an exemplary UFM approach. These images depict filament road shaping as well as metallurgical bonding with an adjacent road. No discernable voids are found in-between roads and layers.

Printer control board 222 may comprise any suitable electronic components, for example microprocessors, resistors, capacitors, inductors, transistors, diodes, light-emitting diodes, switches, traces, jumpers, fuses, amplifiers, antennas, and so forth, in order to control operation of additive manufacturing system 200. In some exemplary embodiments, additive manufacturing system 200 is controllable via a link to a software program operative on a personal computer.

In some exemplary embodiments, additive manufacturing system 200 utilizes an X-axis motor 216, a y-axis motor 217, and a z-axis motor 218. These motors may be operable to position and/or relocate components of additive manufacturing system 200, for example print tool 213 and/or build plate 219, as desired. However, any suitable components or systems for translation, rotation, and/or other movement of relevant portions of additive manufacturing system 200 are considered to be within the scope of the present disclosure.

With reference now to FIG. 4, additive manufacturing system 200 may be operated in a "continuous stitch" mode whereby discrete voxels are sequentially formed. In this mode, the build plate 219 and/or the print tool 213 may be translated in the X,Y, or Z dimensions between voxels; however, most commonly a single linear "road" of adjacent voxels will be formed, and then an adjacent road, and so forth. FIG. 4 illustrates the resultant high-quality inter-layer and inter-filament bonds.

Figure 5:
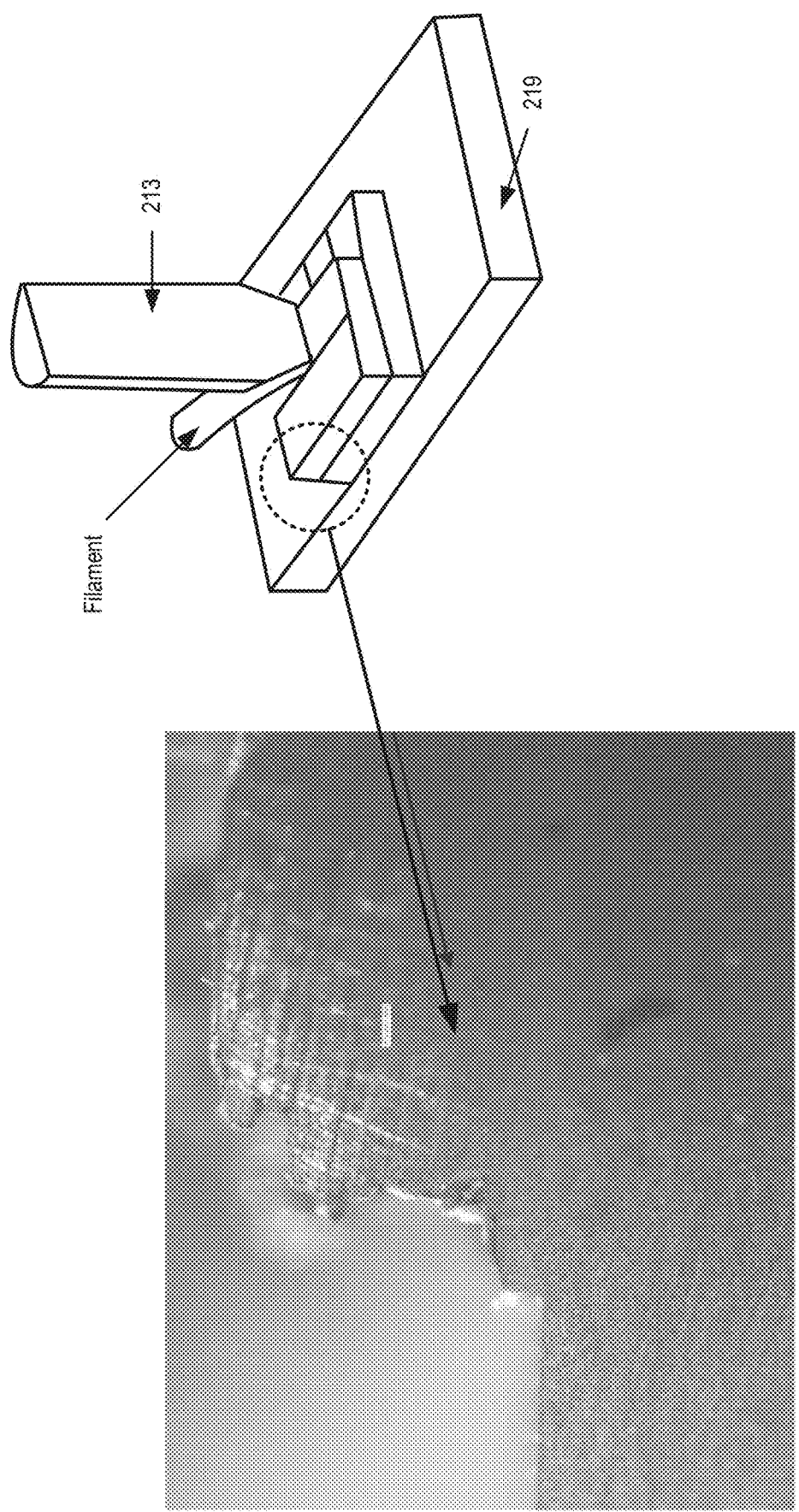
FIG. 5 illustrates results of operation of an exemplary additive manufacturing system in a orthogonal layer approach in accordance with an exemplary embodiment.

Turning now to FIG. 5, additive manufacturing system 200 may be operated in a mode whereby voxel "roads" of a first layer are orthogonal to voxel "roads" of a second, adjacent layer (for example, via rotation of build plate 219 between layers, repositioning of the print tool 213, and/or the like). FIG. 5 illustrates an exemplary 18-layer structure with 0.11 mm layer thickness and 2 mm×2 mm footprint formed in this manner from A1100 (99.9%) aluminum. Again, the high quality of the resulting material is evident.

Figure 3A:
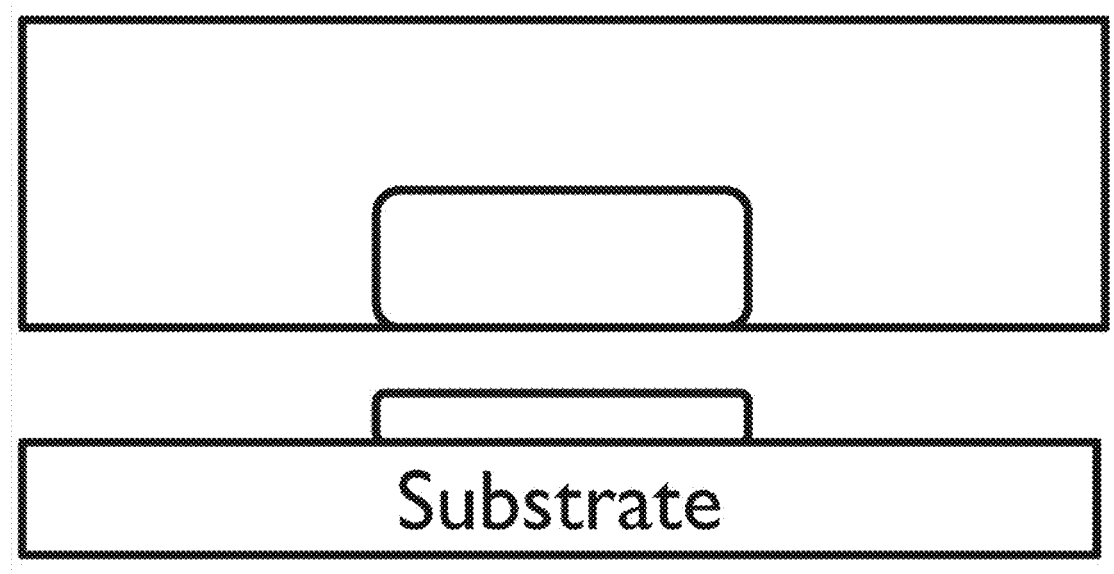
FIG. 3A illustrates operation of an exemplary additive manufacturing system to deposit a single voxel in accordance with an exemplary embodiment.
Figure 3A:
Figure 3B:
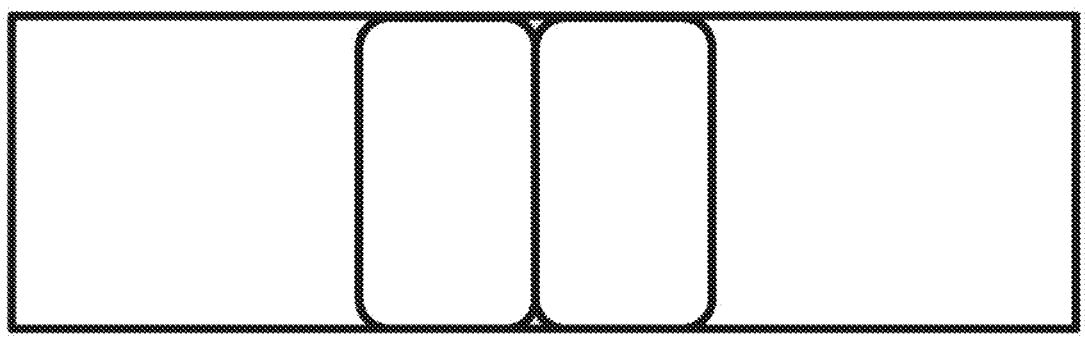
FIG. 3B illustrates operation of an exemplary additive manufacturing system to deposit a pair of adjacent voxels in accordance with an exemplary embodiment.
Figure 3B:
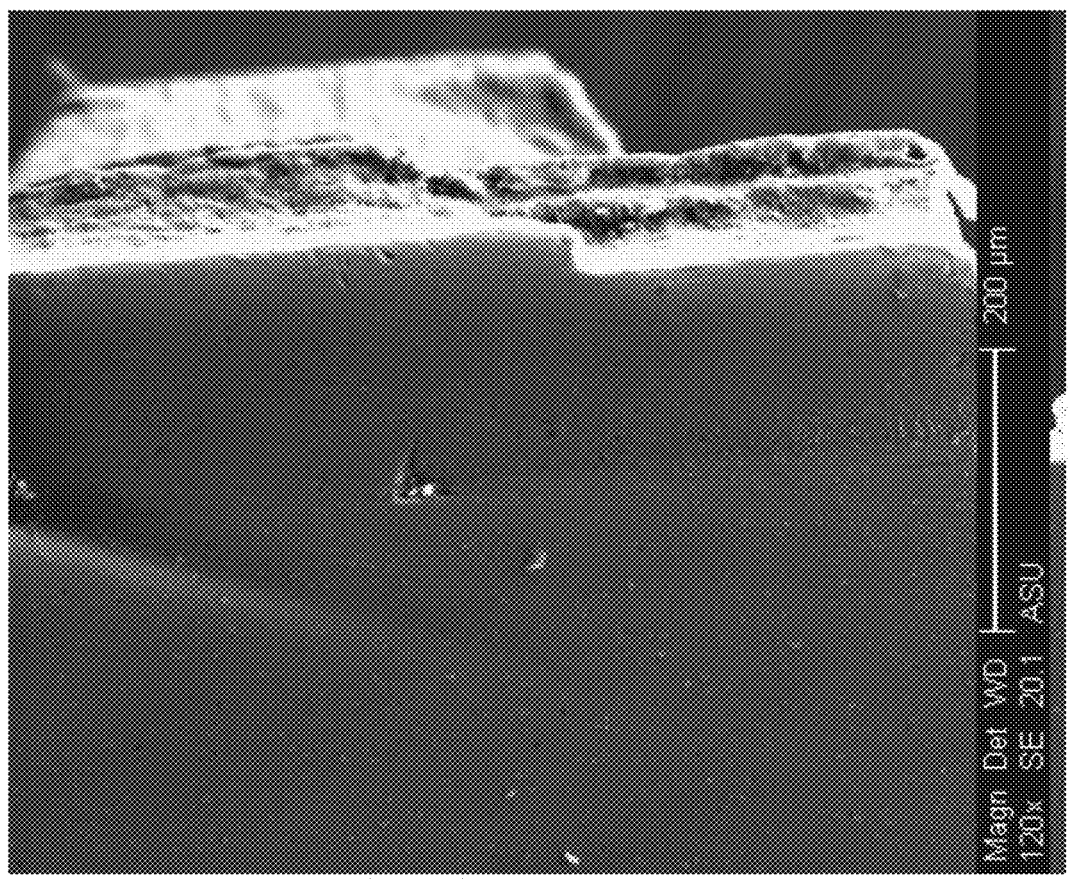
Figure 3C:
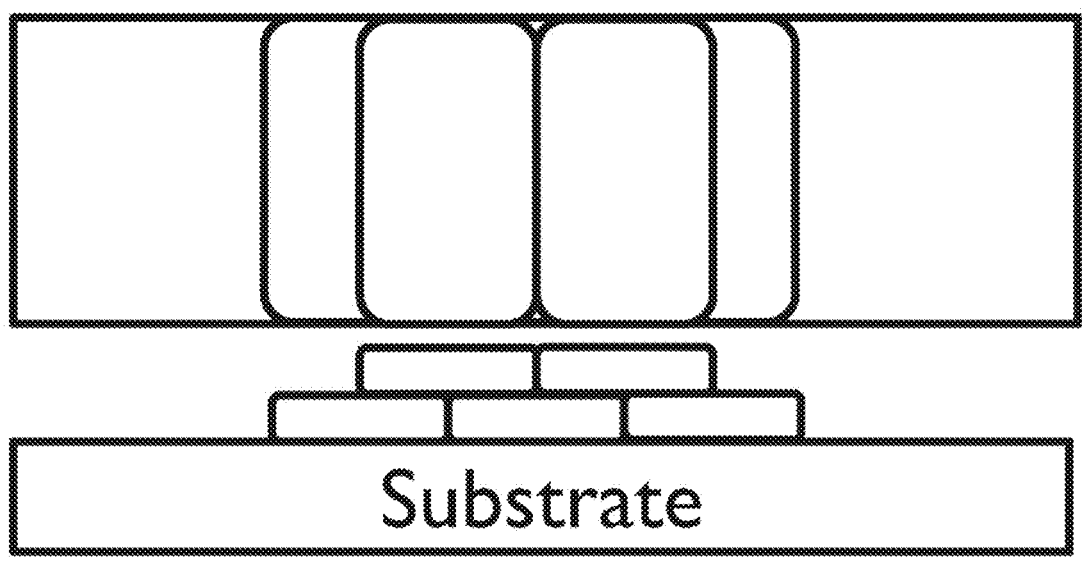
FIG. 3C illustrates operation of an exemplary additive manufacturing system to deposit two layers of adjacent voxels in accordance with an exemplary embodiment.
Figure 3C:
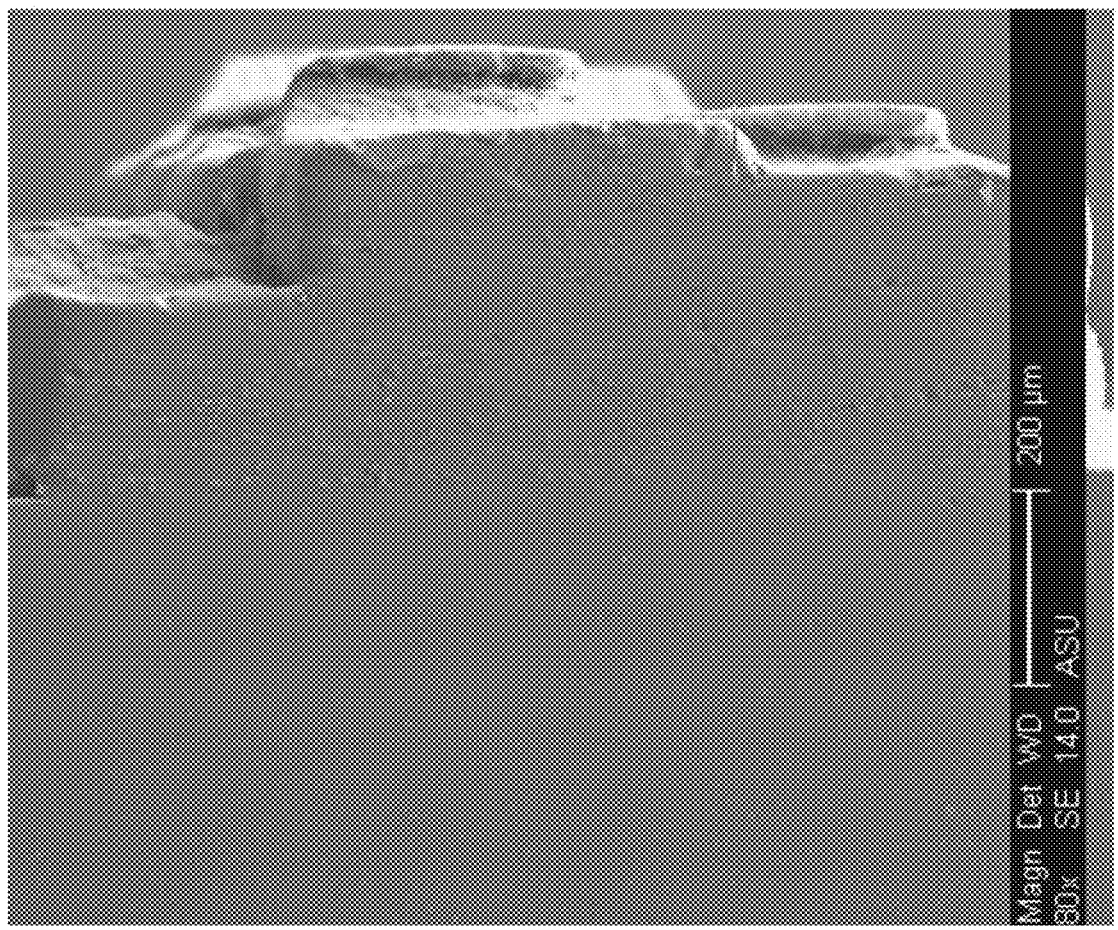

With reference now to FIGS. 3A, 39, and 3C, micrographs of an exemplary voxel or voxels formed via operation of additive manufacturing system 200 are presented. FIG. 3A illustrates formation of a 1.5 mm long, continuously bonded voxel having a 0.15 mm thickness. FIG. 3B illustrates formation of two adjacent 1.5 mm long, continuously bonded voxels having a 0.15 mm thickness. FIG. 3C illustrates formation of a first layer of adjacent 1.5 mm long, continuously bonded voxels having a 0.15 mm thickness, and thereupon a second layer of adjacent 1.5 mm long, continuously bonded voxels having a 0.15 mm thickness.

Figure 6A:
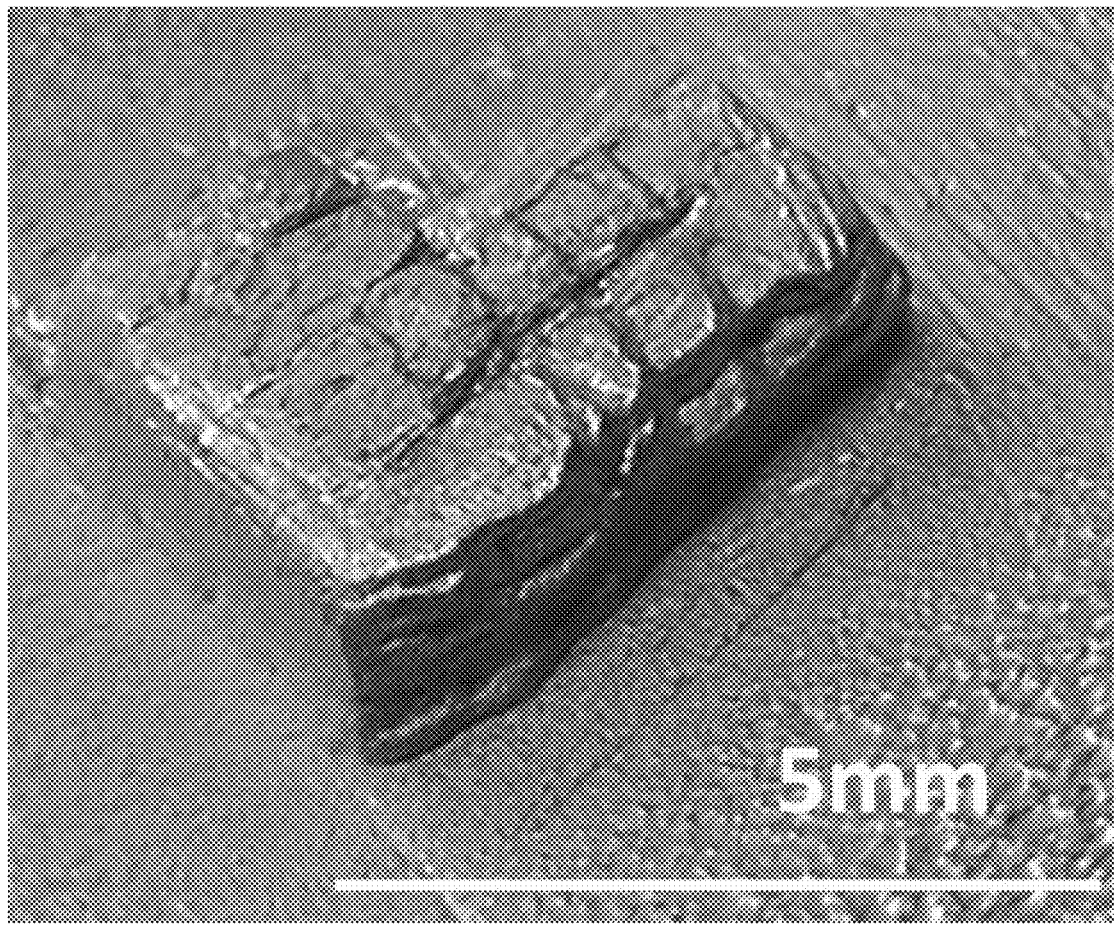
FIG. 6A illustrates results of operation of an exemplary additive manufacturing system as a stand-alone metal additive manufacturing process in accordance with an exemplary embodiment.

To further demonstrate the feasibility of the exemplary UFM approach as a stand-alone 3-D printing process, an L-shaped 3-D object was successfully printed via operation of additive manufacturing system 200. As shown in FIG. 6A, the object is 5 mm long, 4 mm wide, and approximately 1.5 mm tall with a layer height of about 125 microns.

Figure 6B:
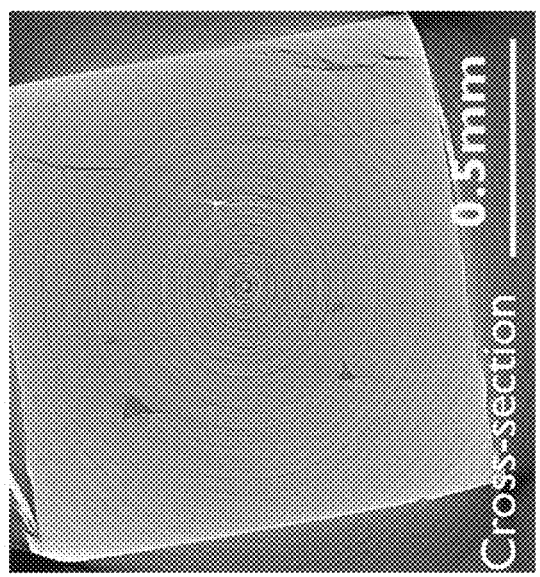
FIG. 6B illustrates results of operation of an exemplary additive manufacturing system as part of a hybrid additive-subtractive manufacturing process in accordance with an exemplary embodiment.
Figure 6B:
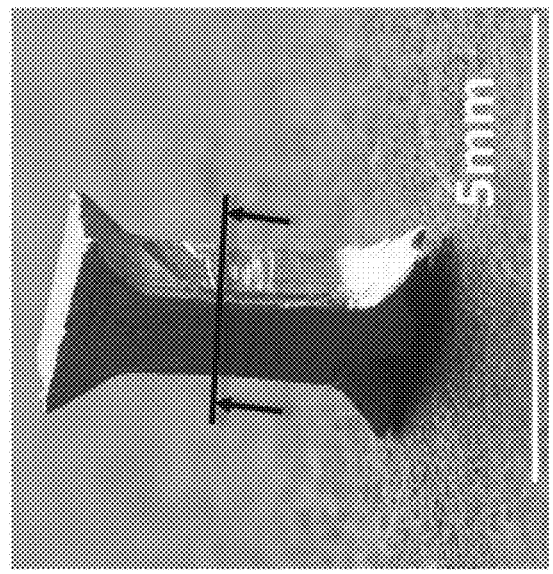
Figure 6B:
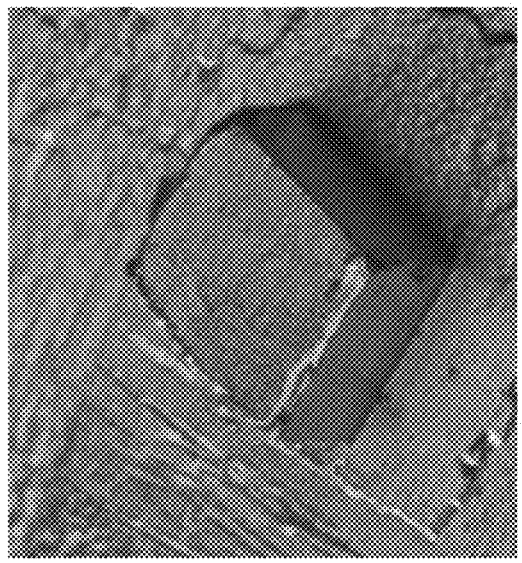

Moreover, UFM may be utilized as a hybrid additive-subtractive manufacturing process. With reference now to FIG. 6B, a 16 layer-aluminum structure was 3-D printed and machined down to a tensile bar-shaped object as photographed and shown in FIG. 6B. X-ray microtomography results were obtained for the mid-section of the sample, and one representative slice is shown in FIG. 6B. In the micro-CT scans of the UFM printed sample, the inter-layer interfaces are discernable, while no inter-filament interfaces are observed. Over 95% density is observed.

Figure 7A:
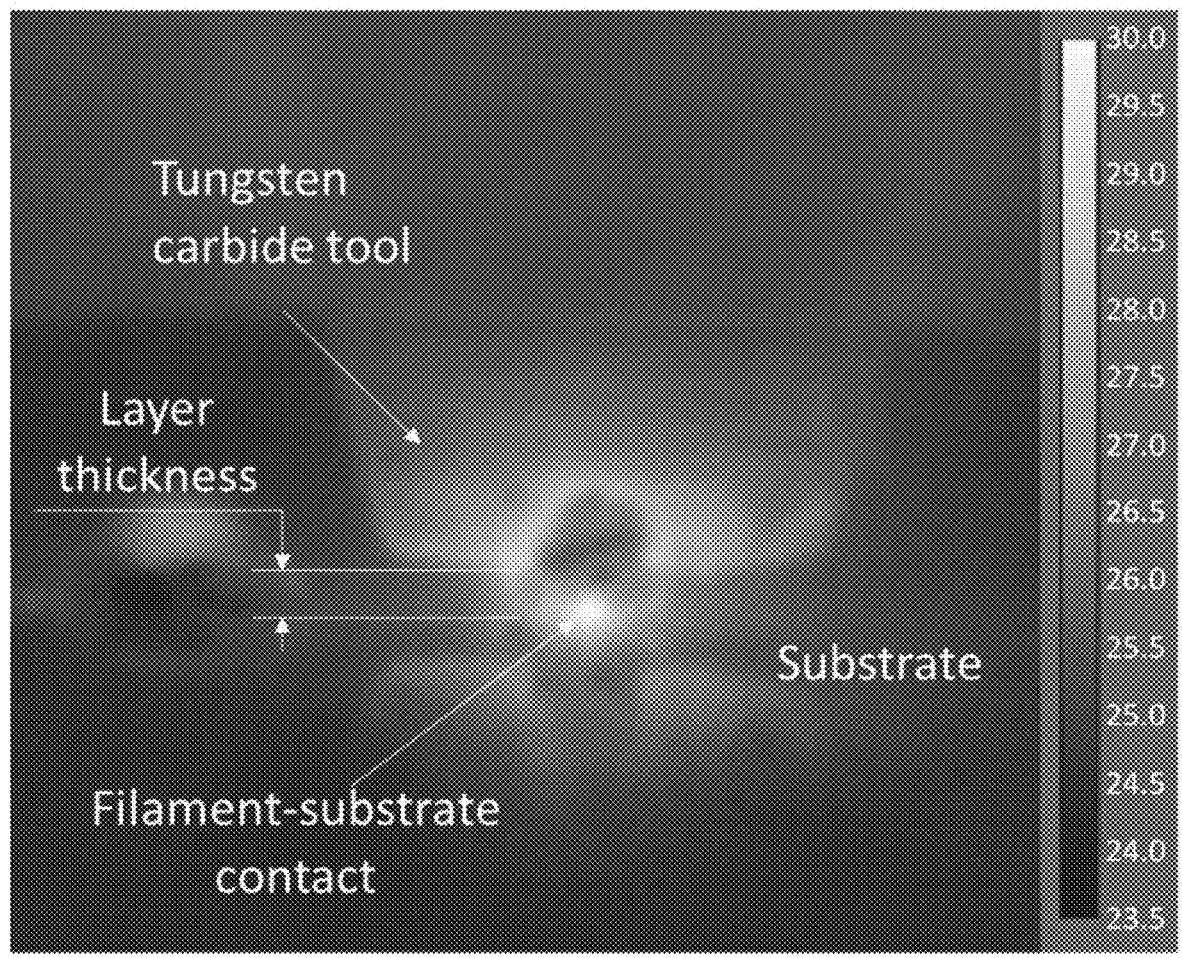
FIGS. 7A and 7B illustrate thermal characterization of operation of an exemplary additive manufacturing system in accordance with an exemplary embodiment.
Figure 7B:
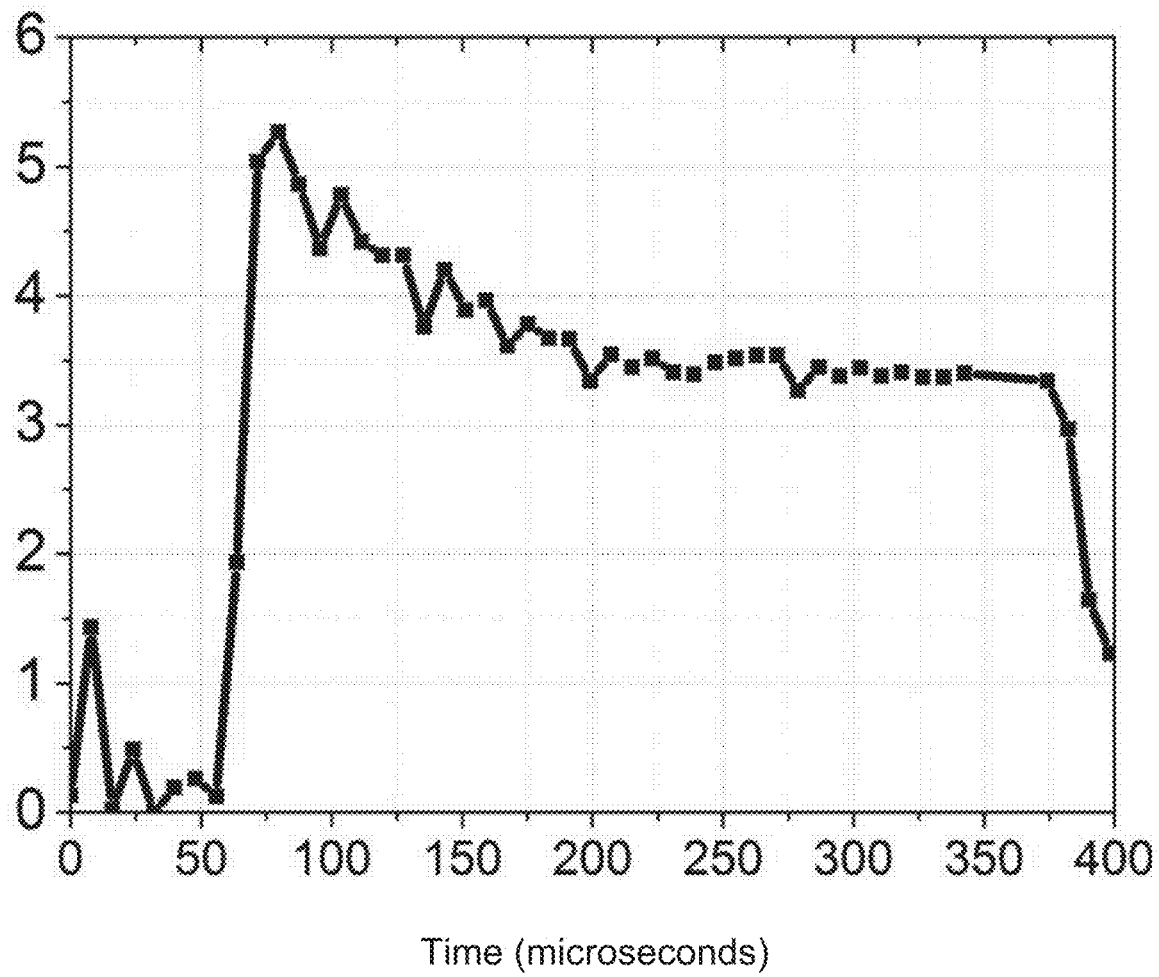

As compared to prior metal additive manufacturing processes where significant heating was required, exemplary UFM processes of the present disclosure do not generate significant heating. With reference now to FIGS. 7A and 7B, high-resolution IR imaging and thermal couple probing of surface temperatures may be used to quantify the temperature rise associated with an exemplary embodiment of UFM. As seen in FIG. 7A, high-speed IR videography shows that the maximum temperature rise for the formation of one voxel is less than 5 degrees. In FIG. 7A, one frame of thermal video captured during voxel formation shows the spatial temperature distribution in the vicinity of the voxel at the time the maximum temperature is reached.

Also presented in FIG. 7B is an exemplary time evolution of the temperature at the filament-substrate interface. The time evolution of temperature at the critical filament-substrate interface indicates that the fusion of a voxel initiates within 30 microseconds of application of ultrasonic energy, while the shaping of the voxel continues to develop as the voxel process time continues (in FIG. 7B, the irradiation of ultrasonic vibrations start at the 50th microsecond). The relative movements between the two surfaces provide frictional heating that results in the sharp temperature rise. Another 30 microseconds into the process, the metallurgical bond starts to form and the relative movements between the filament and substrate stops. This removes the frictional heat source and allows the interface temperature to drop. A maximum temperature rise of about 5 degrees is observed. Another feature in the illustrated temporal temperature profile is the sharp reduction at about 350 microseconds where the ultrasonic vibration stops. This indicates the removal of the second heat source in the process: cyclic plastic strain heating due to the high-frequency cyclic shear deformation in the voxel as it forms. In operation, additive manufacturing system 200 may apply ultrasonic energy to a voxel for a suitable length of time, for example 100 microseconds, 200 microseconds, 320 microseconds, 400 microseconds, 550 microseconds, and/or the like.

Figure 8A:
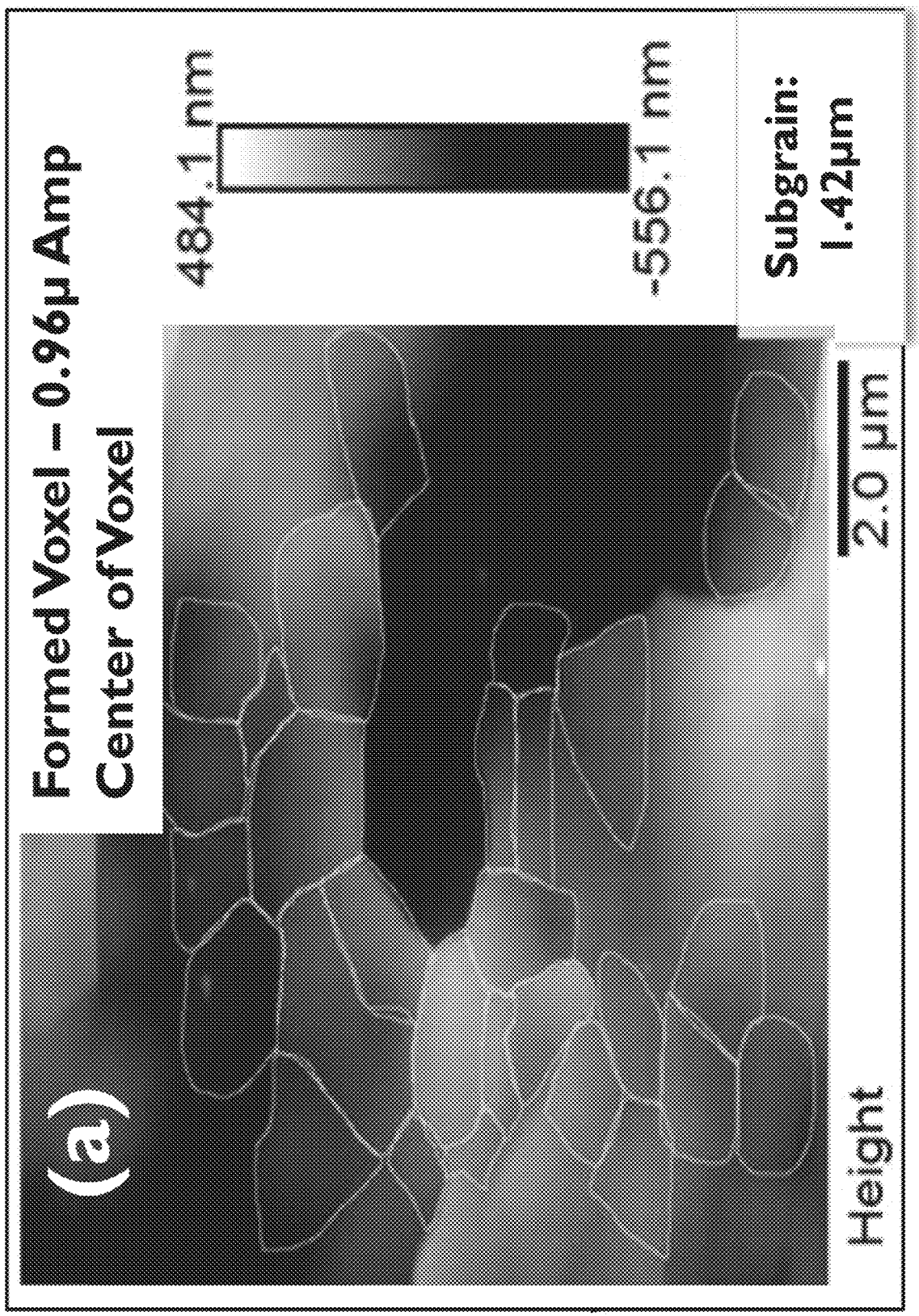
FIGS. 8A and 8B illustrate microstructural characteristics of materials formed via operation of an exemplary additive manufacturing system in accordance with an exemplary embodiment.

Exemplary UFM systems and methods may be utilized to influence the microstructure of metals. In connection with operation of additive manufacturing system 200, metallography sample preparation and atomic force microscopy may be used to characterize a cross-section (normal to the filament axis) of a voxel at three states: (i) unprocessed virgin aluminum filament, and (ii) and (iii) aluminum voxels formed with two different levels of ultrasonic energy inputs that correspond to 0.96 and 0.98 micron vibrational amplitudes of print tool 213. It will be appreciated that additive manufacturing system 200 may be configured to utilize any suitable vibrational amplitude for print tool 213 (for example, a vibrational amplitude between about 0.9 micron and about 1.1 micron). The results, summarized in FIGS. 8A and 8B, indicate a clear evolution of microstructure as the UFM process occurs. FIG. 8A shows microstructures of aluminum voxels formed at lower ultrasonic power (corresponding to 0.96 micron amplitude), and FIG. 8B shows microstructures of aluminum voxels formed at higher ultrasonic power (corresponding to 0.98 micron amplitude) settings respectively, both at 300 microsecond ultrasound irradiation time.

Figure 8B:
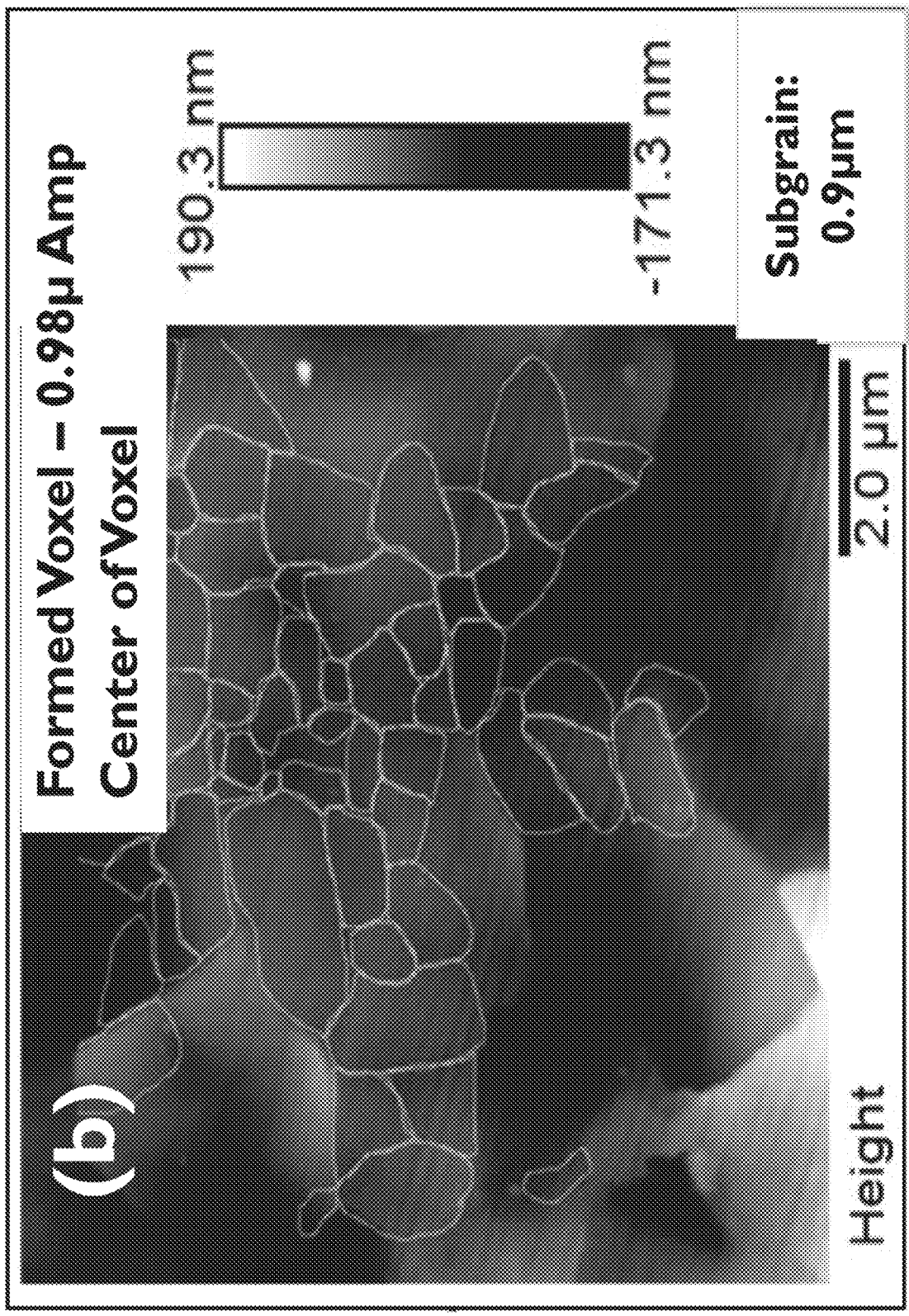

The virgin filament shows an average grain size of approximately 10 microns, whereas both of the formed voxels illustrated in FIGS. 8A and 8B show formation of sub-grains within the primary grains. Grain size analysis shows that the primary grains remain approximately the same size; they are deformed as a result of the plastic strain in the voxels. Further, at the lower ultrasound energy input, the sub-grains have an average size of 1.4 microns while the average sub-grain size at increased ultrasound input is reduced to 0.9 microns. Thus, additive manufacturing system 200 facilitates design and/or control of sub-grain structure based on power supplied to print tool 213, enabling greater control over the properties of the resulting structure.

Operation of additive manufacturing system 200 utilizes a physical phenomena identified herein for the first time. First, UFM processes utilize the well-observed ultrasonic softening of crystalline metals. The acoustic softening effect was first identified in the 1950s and is believed to be due to the lowered activation energy due to dislocation gliding as a result of acoustic energy concentrated at lattice defects such as dislocations and grain boundaries. Empirical relationships have been derived to relate the observed softening and residual hardening effects with qualitative terms related to acoustic energy inputs. In addition, modified plasticity models have been developed and used to explain acoustic softening observations. The material softening observed in the UFM process is consistent with what has been documented in the literature.

More importantly, additive manufacturing system 200 utilizes a second, novel mechanism herein disclosed for the first time, that involves drastically increased mass transport (4-6 orders of magnitude) at the crystal lattice level over large spatial domains (hundreds of nanometers) within a short amount of time (less than 1 second). This second phenomenon utilized by UFM processes and/or by additive manufacturing system 200 involves large amounts of mass transport across material interfaces in the presence of ultrasonic vibrations in the kHz frequency range, but with limited temperature rise. Prior phenomena have been observed in wire bonding and recently in Ultrasonic Consolidation, UC, but with larger amounts of temperature increases. In contrast, additive manufacturing system 200 provides for significant mass transport without significant temperature rise.

In various exemplary embodiments, the ultrasound power density irradiated into the aluminum voxel used in UFM reaches 160 W/cm2 or greater, based on the measured and/or calculated vibration amplitude, voxel geometry, and process parameters. Principles of the present disclosure contemplate that the theory of quantum diffusion of vacancies is a potential explanation for the enhanced mass transport achieved by additive manufacturing system 200.

Process temperature rise. The temperature rise in the UFM process can be attributed to three heat sources as captured in the temporal temperature evolution shown in FIG. 7B: (1) the volumetric heat generation from large amounts of plastic deformation associated with the height change in the filament during voxel formation, (2) the frictional heat generated due to the cyclic relative motion between the filament and the substrate (or an existing filament surface), and (3) the cyclic shear deformation of voxel in the filament axial direction. The volumetric heat generation due to plastic deformation associated with the voxel height change can be evaluated by first calculating the mechanical work done during the linear deformation:

$$W_p = \int_{h_0}^{h} \text{area} \times \sigma_y \times \delta h \qquad \text{(Equation 1)}$$

where $\sigma_y = \xi K \varepsilon_p^n$ is the flow stress, $\xi$ is the softening factor due to ultrasonic energy, $\varepsilon_p$ is the plastic strain and K and n are material constants (for example, for aluminum they are obtained to be K=155.65 MPa and n=0.2123). Assuming $\xi$ to be 1, the total mechanical work for voxel formation is $W_p$=0.01 J. For aluminum it has been shown that approximately 30% of plastic strain energy will dissipate as heat while the rest is stored in the defects in the lattice. This means the compressive strain in the voxel formation amounts to less than 0.01 W of the volumetric heat generated during formation of an aluminum voxel, considering that in the exemplary embodiment considered, the voxel formation process takes place over about 300 milliseconds.

The second source of heat generation is the frictional heating from the relative movements between the voxel and the substrate or the voxel and the print tool 213. If the assumption is made that there is no slip between the print tool 213 and the voxel, this can be modeled as:

$$Q_f = \mu F U \qquad \text{(Equation 2)}$$

where $\mu$ is the coefficient of friction on the voxel-substrate contact, and U is the speed of their relative movements, which is approximated as: $U = 4Af$ (Equation 3) where A is the amplitude of vibration, $f$ is the frequency of vibration, and F is the contact force.

In an exemplary operation of additive manufacturing system 200 with aluminum, a metallurgical bond forms at 30 microseconds into voxel formation when the contact force is about 10N, the vibrational amplitude is about 0.98 microns, and the frequency is about 60 kHz. For the aluminum filament-aluminum substrate interface under irradiation of ultrasound vibration, a friction coefficient of 0.3 is assumed during voxel formation. Based on these values, the total frictional heat generation on the filament-substrate contact is calculated to be about 0.7 W.

The third component of heat generation takes place as the plastic strain due to the cyclic deformation in the voxel dissipates as volumetric heat. In an exemplary embodiment, the amplitude of vibration at the print tool 213/voxel contact is 0.98 microns; this is also the maximum displacement on the surface of a voxel at a given cycle of vibration. The resulting total shear strain during voxel formation varies from 0.33% to 0.83%. For the aluminum used in this exemplary embodiment, the strain above which the voxel enters plastic deformation is 0.13%. The amount of strain in each vibration cycle contributing to plastic strain heating, therefore, varies from 0.2% to 0.7%. Taking into account the 30% heat dissipation partition and the operating frequency of this exemplary UFM process, the average total heat generation due to cyclic plastic deformation during voxel formation is about 0.75 W.

Microstructure Evolution. The microstructure of an aluminum voxel formed via additive manufacturing system 200 shows a microstructure similar to what is commonly observed in dynamic recovery of aluminum. Dynamic recovery can take place in hot working conditions (T>50% Tm), in strains of less than $\epsilon$=40. This behavior is typically seen in materials with high stacking fault such as aluminum and titanium. One distinct characteristic is the formation of subgrains within primary grains as a result of formation of small angle grain boundaries as dislocations accumulate within primary grains.

In UFM, for example as implemented in additive manufacturing system 200, similar microstructural evolution is observed. However, operation of additive manufacturing system 200 takes place at room temperature (T<5% Tm), and the amount of strain experienced in the voxels is approximately $\epsilon$=1. In addition, principles of the present disclosure contemplate that the extent to which this microstructural evolution process takes place increases as the ultrasonic energy input into the voxel increases. Accordingly, while the driving mechanism behind the microstructural evolution observed in UFM differs from those in dynamic recovery, the trend illustrating microstructural dependence on ultrasonic energy input is similar to that in dynamic recovery where, as the working temperature increases, a decrease in sub-grain size is observed. Accordingly, regarding operation of additive manufacturing system 200 from an energetics' perspective, this trend suggests that the irradiation of ultrasonic energy allows the material lattice to reach a higher energy state where the dynamic recovery due to dislocation hopping and merging can occur readily (as if the temperature of the materials is significantly raised, but without actually raising the temperature of the materials significantly).

Additive manufacturing system 200 is configured to utilize the dependence of this behavior on ultrasonic energy input in order to manipulate the microstructure of the formed object. It is believed that additive manufacturing system 200 is the first system to utilize and/or disclose this capability. In the context of UFM as a metal 3-D printing process, this dependence of material microstructure on process input means the mechanical properties of 3-D printed parts can be controlled and tuned in real-time by additive manufacturing system 200 during the building process by understanding and controlling the process physics.

With reference again to FIG. 7A, to characterize operation of additive manufacturing system 200, a FUR A6751 camera may be used for IR imaging of the voxel formation in UFM. The imaging frequency may be a suitable speed, for example 125.6 Hz. Black polymeric film may be used on part of the tungsten-carbide print tool 213 to reduce the reflectivity of the surface. Thermocouples may be used to measure the substrate surface temperature, for example at 0.9 mm and 4.3 mm away from the center of the voxel.

Returning to FIGS. 8A and 8B, via operation of additive manufacturing system 200, aluminum voxels of two different ultrasonic powers (corresponding to amplitudes of 0.96 microns and 0.98 microns respectively) were formed on aluminum 1100 substrates and the microstructures of the formed voxels were examined. After the voxels formed on the substrate, their cross-sections were prepared following standard metallography procedures. The samples were polished with 320 grit silicon carbide abrasive disc, followed by 600 grit silicon carbide abrasive disc. Further polishing was performed using 6 µm polycrystalline diamond particles followed by 0.05 µm alumina slurry. Between each polishing step, the samples were cleaned in an ultrasonic DI water bath. After the polishing process, the samples were etched in an etchant containing 25 ml methanol, 25 ml HCl, 25 ml nitric acid and 1 drop HF. The etched samples were examined on a Bruker Multimode Atomic Force Microscope (AFM) to reveal the microstructure of the aluminum voxels as illustrated in FIGS. 8A and 8B.

Additionally, principles of the present disclosure develop the knowledge foundation of a transformational approach to metal-polymer digital material fabrication in which the material and spatial composition of the metal and polymer constituents can be designed, executed, and characterized on a voxel-to-voxel basis. At the heart of this approach lies the parallel additive fabrication processes of ultrasonic metal bonding and thermal polymer fusing. Driven by acoustic softening and acoustic vibration-enhanced solid-state diffusion, the metal constituent of a metal-polymer heterogeneous material can be spatially formed voxel by voxel as disclosed above, while the thermal fusing-driven process fills the places of the polymer constituent. Alternating between the two, spatial and compositional heterogeneity can be achieved at different scales. In these exemplary approaches, additive manufacturing system may be configured with a first tool (for example print tool 213) for use in metal deposition, and a second tool (for example, a nozzle) for use in polymer deposition.

The transformational thermal-acoustic additive manufacturing approach for polymer-metal heterogeneous materials disclosed herein addresses the challenges of process inefficiency and material uncertainty faced in the area of digital materials and manufacturing. For example, the array of new metal-polymer composite materials with fine-tuned mechanical, physical, and electromechanical properties can reduce the overall weight and cost of systems and improve on their performance by allowing composites to have location-, application-, and requirement-specific properties; second, the real-time material property monitoring and control element of the disclosed approach can increase the system reliability by allowing the manufacturing process as well as the product quality to be monitored, and adjusted in real-time during its building process; third, the disclosed approach uses acoustic energy for metal, and thermal energy for polymer to achieve deformation and bonding of materials. This unique combination of energy sources allows for efficient use of energy. Coupled with the "material-as-needed" nature of the additive approach, it reduces manufacturing cost of components and systems, and provides on-board design and fabrication capabilities of spare or replacement parts, for example for space flight missions.

Polymer-based heterogeneous materials become preferable to traditional single-phase materials in a wide range of critical applications in aerospace engineering where performance requirements such as strength-to-weight ratio, space constraints, and overall system energy efficiency are important. Among these desirable applications, the development of Ionic Polymer-Metal Composite, IPMC, active material systems in the areas of robotics and human support in space applications not only represents an important area of current development, but it also plays a key role as the future of space exploration takes its shape. However, a barrier, in addition to the need for new breakthroughs in polymer chemistry, to constructing actual devices with theoretically-predicted performances and required reliability previously lay in the lack of a manufacturing approach in which the material and spatial composition of the end product can be precisely planned, executed, and controlled: a closed-loop hybrid metal-polymer direct digital manufacturing approach.

Current polymer and metal direct digital manufacturing, DDM, systems can be roughly categorized into three types by the forms of starting materials used: liquid, solid filaments or films, and powders. While liquid photo-curable polymer is only used in polymer DDM, metal AM systems use thermal energy to selectively melt and fuse materials for 3-D parts layer by layer. Processes such as Selective Laser Melting (SLM), or Laser Engineered Net Shaping (LENS), though common, suffer from high equipment and operating cosst, low energy efficiency and powder recycle rate, as well as health risks associated with working with metal powders. Originally developed by NASA, the Electron Beam Free Form Fabrication (EBF3) operates on the same principle as electron beam welding. By manipulating the 3-D paths of the molten metal pool, solid modeling is achieved in high vacuum environments. The critical challenges faced by this process are the resolution of the process and the difficulties in process scale-up. These approaches represent the fundamental issue why a hybrid metal-polymer additive manufacturing process previously was not achievable: the incompatibility of melting-based metal AM processes with polymer processes due to their large process temperature differences.

Ultrasonic Additive Manufacturing is a process that alternates between ultrasonic welding of layers of metal foil and CNC milling to produce near-net shape and net shape parts. This process utilizes the acoustic softening of metal and the enhancement in solid-state diffusion to create stress-free metallurgical bond between layers of metal foil, followed by mechanical milling at each layer to form parts layer by layer. Though an excellent example of combing traditional and advance manufacturing processes, this approach creates large amounts of waste materials, and the use of the foil raw material renders the simultaneous use of metal and polymer impractical. Micro-extrusion-based additive modeling and ink droplet printing processes such as electrodynamic jetting are processes currently in development by the nano-/micro-manufacturing community. These processes are capable of producing hybrid metal-polymer heterogeneous materials, and utilize metal particles mixed-in with polymer bases for printing to obtain the required electrical properties of the final product. However, the mechanical properties of the final product are far inferior to those of the constitutive metal components. In addition, the printed metal particle traces in the final product typically need to go through thermal processes to obtain the desired electrical properties.

One of the most important issues of current DDM methods is the "open-loop" nature in which they operate. Typically a DDM process, whether it be SLA, FDM, or others, receives no information on the build characteristics such as material properties of the component, and relies only on passive system-level signal detection such as force and collision to terminate the building process to prevent damage to the system (e.g., the "wiper" in the SLA and SLS systems). This mechanism is ineffective as defects in the product have to accumulate to such a degree that moving components in the system experience threshold resistance to accomplishing their prescribed functions before the system shuts down the process. At this point, human intervention is required to restart the build process and the materials in the failed build cannot be recovered. More importantly, this mechanism provides no information on the dimension, defect, or material properties of the product. Quality control can only be achieved post-fabrication.

To address the multitude of issues preventing the application of current additive manufacturing processes to design and fabrication of multi-scale polymer-metal heterogeneous materials, principles of the present disclosure contemplate a transformational metal-polymer hybrid additive fabrication approach in which the material and spatial composition of the metal and polymer constituent materials can be designed, executed, and characterized on a voxel-to-voxel basis.

This new approach can create a paradigm shift in the design, testing, manufacturing, and characterization cycle of new metal-polymer heterogeneous materials. It streamlines the development process of space technologies such as ultra-high strength-to-weight ratio composites and ionic polymer-metal composite based adaptive materials for soft machines and robots. The space-compatible and energy efficient nature of the present systems and methods means that on-board design and fabrication of new or replacement components during space travel and exploration becomes possible, increasing the affordability and sustainability of such missions. In addition, the present disclosure contemplates integration of a polymer-metal composite digital manufacturing approach with the development of computational design and analysis tools to accelerate the development of prototypes and concepts necessary to enable an innovative integrated design-to-product approach. The multi-scale metal-polymer heterogeneous digital manufacturing approach developed herein enables the unprecedented full-composition-range metal-polymer composites in the length scale between 100 micrometers and potentially meters. Coupled with the intrinsic flexibility in component and assembly design provided by the additive fabrication nature of the proposed process, this tune-ability in product composition allows new approaches to structural design and assembly of sub-meter scale system to be rapidly prototyped and verified.

The true 3-D manufacturing nature and the flexibility in material composition and property tuning offered by the disclosed DDM approach not only means accelerated design, prototyping, and characterization process of new IMPC-based soft actuators and sensors, but it also enables soft actuator designs with 3, 4 or even 5 degrees of freedom in movements to be realized that were not previously feasible due to complex 3-D metal electrode layout. This crosscutting impact provides synergy between the present disclosure and that of the soft machine technology topic area.

Principles of the present disclosure capture the physics and mechanics of the process acoustic softening in a continuous time-space domain. In a small material domain, high-frequency ultrasonic bonding environment similar to the processes disclosed herein, a large amount of plastic deformation takes place in the entire domain of material between the ultrasonic capillary and the substrate. This process is driven almost entirely by acoustic softening of materials. In this volume the material stress-strain relations are different due to acoustic softening effects.

Exemplary systems are implemented in an environment with multiple components: metal and polymer wire material handling, acoustic and thermal energy source and delivery, mechanical motion, and process control and feedback systems.

Metal and polymer wire material handling. As the material source of the process, this portion of the environment is responsible for the storage, feed, and withdraw of the metal as well as the polymer wire materials. It is highly coordinated with the acoustic and mechanical component to provide controlled motion of the wire needed by the process. The metal and polymer constituent materials are handled separately in their own capillary and nozzle, and the material delivery to the required voxel alternates between the two to reduce the complexity of the environment and to accomplish composition heterogeneity.

Acoustic and thermal energy source and delivery. This component converts energy from the electrical form to acoustic and thermal forms and delivers them into the metal capillary and the polymer nozzle. An exemplary system utilizes a single-mode ultrasonic vibration system with a tuneable frequency range of 40 kHz to 200 kHz in longitudinal vibration mode. A thermal energy system is used to provide heating to the polymer nozzle to above glass transition of target polymer materials, as well as the build domain to a moderate temperature (~50 C) to prevent defects associated with thermal shock during extrusion and deposition.

Mechanical motion and process control & feedback systems. This component of the environment supports (1) linear motions in 3 axes, and (2) receives the mechanical, thermal, acoustic signals from all other components and observes the system characteristics such as real-time status of the building process, part defect conditions, and material properties. Exemplary systems demonstrate real-time acoustic signal excitation, detection, and visualization for bond defect detection and for material property evaluation.

Principles of the present disclosure contemplate application of this approach to the design, prototype, and characterization of ionic polymer-metal composite based artificial muscles. For example, the principles contemplate components ranging from simple 1-axis motion actuators to IPMC-based 4-axis active material capable of translation in 3 axes and rotation about 1 of these axes.

Principles of the present disclosure may be utilized in connection with principles of additive manufacturing disclosed in U.S. Provisional Patent Application No. 62/210,041 filed on Aug. 26, 2015, the contents of which are incorporated herein by reference in their entirety for all purposes.

While the principles of this disclosure have been shown in various embodiments, many modifications of structure, arrangements, proportions, the elements, materials and components, used in practice, which are particularly adapted for a specific environment and operating requirements may be used without departing from the principles and scope of this disclosure. These and other changes or modifications are intended to be included within the scope of the present disclosure and may be expressed in the following claims.

The present disclosure has been described with reference to various embodiments. However, one of ordinary skill in the art appreciates that various modifications and changes can be made without departing from the scope of the present disclosure. Accordingly, the specification is to be regarded in an illustrative rather than a restrictive sense, and all such modifications are intended to be included within the scope of the present disclosure. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element of any or all the claims.

As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. When language similar to "at least one of A, B, or C" or "at least one of A, B, and C" is used in the claims or specification, the phrase is intended to mean any of the following: (1) at least one of A; (2) at least one of B; (3) at least one of C; (1) at least one of A and at least one of B; (5) at least one of B and at least one of C; (6) at least one of A and at least one of C; or (7) at least one of A, at least one of B, and at least one of C.

What is claimed is:

1. A method for 3-D printing a metal object, the method comprising:

forming a series of layers comprising the metal object, each layer formed from a metal filament, wherein forming each layer comprises:

forming a series of voxels from the metal filament via application of ultrasonic energy to a print tool in contact with the metal filament, wherein the print tool comprises a tungsten carbide bar having a thickness of between 2 mm and 3 mm and a length of between 12 mm and 25 mm, wherein a portion of the print tool in contact with the metal filament vibrates with an amplitude of between 0.9 microns and 1.1 microns responsive to the ultrasonic energy, wherein each voxel in the series of voxels is coupled via mass transport to adjacent voxels in the voxel's layer and to adjacent voxels in a previously-formed layer, wherein, during formation of a voxel, the temperature of the metal filament used to form the voxel increases by less than 6 degrees Celsius, wherein each voxel is formed via application of ultrasonic energy for a period of between 200 microseconds and 400 microseconds, and wherein the forming a series of voxels is conducted at room temperature and in ambient atmosphere.

2. The method of claim 1, wherein the metal filament comprises at least one of aluminum, titanium, gold, silver, copper, or a steel alloy.

3. The method of claim 1, further comprising varying an intensity of the applied ultrasonic energy between formation of voxels to alter the microstructure of the metal.

4. The method of claim 1, wherein the print tool comprises a tungsten carbide bar, and wherein the print tool is coupled to a piezoelectric crystal operative at between 40 kHz and 200 kHz.

5. The method of claim 1, wherein forming the series of voxels is conducted at 10 Newtons of force applied to the metal filament.

6. The method of claim 1, wherein the metal filament comprises grains, and wherein, responsive to the application of ultrasonic energy, the grains are deformed to cause sub-grain formation.

7. The method of claim 1, wherein the temperature increase of the metal filament within a voxel in the series of voxels arises from: (i) volumetric heat generation from plastic deformation of the metal filament, (ii) frictional heat generation from relative motion between the metal filament and a prior voxel, and (iii) cyclic shear deformation of the voxel in the metal filament axial direction.

8. A method for additive manufacturing, the method comprising:
  contacting a first length of metal wire with a metal substrate;
  inducing, via application of ultrasonic energy, materials flow and solid-state diffusion in the first length of metal wire in a first target area to bond a portion of the first target area to the metal substrate, wherein the ultrasonic energy is applied to the first length of metal wire via a print tool comprising a tungsten carbide bar having a thickness of between 2 mm and 3 mm and a length of between 12 mm and 25 mm; and
  inducing, via application of ultrasonic energy from the print tool, materials flow and solid-state diffusion in the first length of metal wire in a second target area at least partially overlapping the first target area to bond a portion of the second target area to the metal substrate,
  wherein the materials flow and solid-state diffusion in the first length of metal wire in the first target area occurs with a temperature rise in the wire of less than 6 degrees Celsius.

9. The method of claim 8, further comprising:
  contacting a second length of metal wire to the first target area and the second target area; and
  inducing, via application of ultrasonic energy from the print tool, materials flow and solid-state diffusion in the second length of metal wire in a third target area to bond a portion of the third target area to at least one of the first target area or the second target area.

10. The method of claim 8, wherein 10 Newtons of force is applied to the first length of metal wire during the inducing the materials flow and solid-state diffusion in the first length of metal wire.

11. The method of claim 8, wherein the source of the ultrasonic energy is a piezoelectric crystal operating at a frequency of 60 kHz, and wherein the piezoelectric crystal and the print tool are coupled via a steel horn.

12. The method of claim 9, wherein first length of metal wire, the second length of metal wire, and the metal substrate comprise the same metal, and wherein the combined density of the first target area, the second target area, and the third target area exceeds 95% of the density of the pure metal.

13. The method of claim 8, wherein the portion of the first target area bonded to the substrate forms a voxel.

14. The method of claim 13, further comprising repeatedly forming a series of voxels to form a desired structure.

15. The method of claim 14, further comprising varying the amount of ultrasonic energy applied to a set of voxels in the series of voxels to control a microstructure of the metal grain in the desired structure.

16. The method of claim 8, wherein the method is performed at room temperature and in ambient atmosphere.

17. The method of claim 8, wherein, responsive to the ultrasonic energy, a free end of the print tool vibrates with an amplitude of between 0.9 microns and 1.1 microns.

18. The method of claim 8, wherein the ultrasonic energy is applied for a period of between 200 microseconds and 400 microseconds.

19. The method of claim 9, further comprising removing at least a portion of the first target area, the second target area, or the third target area to form a desired structure.

* * * * *